(12) United States Patent
Bucher et al.

(10) Patent No.: US 12,710,100 B2
(45) Date of Patent: Aug. 18, 2026

(54) BALL VALVE WITH IMPROVED ASSEMBLY CONFIGURATION

(71) Applicant: Dramm Corporation of Manitowoc, Manitowoc, WI (US)

(72) Inventors: Jeffrey Thomas Bucher, Fond du Lac, WI (US); Logan Brent Berge, Manitowoc, WI (US)

(73) Assignee: Dramm Corporation of Manitowoc, Manitowoc, WI (US)

( * ) Notice: Subject to any disclaimer, the term of this patent is extended or adjusted under 35 U.S.C. 154(b) by 0 days.

(21) Appl. No.: 18/773,180

(22) Filed: Jul. 15, 2024

(65) Prior Publication Data

US 2026/0016095 A1 Jan. 15, 2026

(51) Int. Cl.

*F16K 5/06* (2006.01)
*F16K 27/06* (2006.01)
*F16K 31/60* (2006.01)

(52) U.S. Cl.

CPC .......... *F16K 5/0636* (2013.01); *F16K 5/0605* (2013.01); *F16K 5/0647* (2013.01); *F16K 27/067* (2013.01); *F16K 31/602* (2013.01)

(58) Field of Classification Search

CPC .... F16K 5/0636; F16K 5/0605; F16K 5/0647; F16K 27/067; F16K 31/602; F16K 5/0689

See application file for complete search history.

(56) References Cited

U.S. PATENT DOCUMENTS 1,384,159 A 7/1921 Schenker
2,839,074 A 6/1958 Kaiser
3,171,431 A * 3/1965 Hansen ................ F16K 5/0689 251/188
3,960,365 A 6/1976 Horowitz (Continued)

FOREIGN PATENT DOCUMENTS

AU 2012-201545 10/2012
CN 206130171 4/2017

(Continued)

OTHER PUBLICATIONS

International Searching Authority, "International Search Report and Written Opinion," issued in connection with International Patent Application No. PCT/US2018/058501, mailed Feb. 1, 2019, 11 pages.

(Continued)

*Primary Examiner* — John Bastianelli
(74) *Attorney, Agent, or Firm* — Reinhart Boerner Van Deuren s.c.

(57) ABSTRACT

A ball valve assembly is provided. The ball valve assembly includes a valve body and a ball assembly configured to be positioned within the valve body. The ball assembly includes a pin hole positioned between a handle and a partial sphere. The valve body includes a slot extending along an outer surface of a cylindrical wall of the valve body. The slot extends radially around a portion of the cylindrical wall. When the ball assembly is positioned within the valve body, the pin hole is aligned with at least a portion of the slot. The ball valve assembly further includes a pin configured to extend through and simultaneously engage the pin hole and the slot to retain the ball assembly within the valve body.

19 Claims, 12 Drawing Sheets

(56) References Cited

U.S. PATENT DOCUMENTS

| | | | |
|---|---|---|---|
| 4,072,291 A | 2/1978 | Adams | |
| 4,076,211 A | 2/1978 | Krechel et al. | |
| 4,109,673 A | 8/1978 | Horowitz et al. | |
| 4,109,837 A | 8/1978 | Taylor | |
| 4,176,689 A * | 12/1979 | Wrasman | F16K 5/0668 251/315.04 |
| 4,280,522 A | 7/1981 | Pechnyo et al. | |
| 4,709,902 A | 12/1987 | Hansen | |
| 5,031,876 A | 7/1991 | Giacomini | |
| 7,021,334 B1 | 4/2006 | Helmer | |
| 7,549,445 B2 | 6/2009 | Mikiya et al. | |
| 10,527,179 B2 | 1/2020 | Bucher et al. | |
| 10,989,314 B2 | 4/2021 | Bucher et al. | |
| 2001/0035514 A1 | 11/2001 | Laskaris et al. | |
| 2012/0181466 A1* | 7/2012 | Gamache | F16K 5/0242 251/231 |
| 2015/0308576 A1 | 10/2015 | Yelkin et al. | |
| 2017/0108128 A1* | 4/2017 | Conway | F16K 37/0008 |
| 2020/0103038 A1 | 4/2020 | Bucher et al. | |

FOREIGN PATENT DOCUMENTS

| | | |
|---|---|---|
| CN | 206802329 | 12/2017 |
| CN | 207961588 | 10/2018 |
| JP | 08303614 | 11/1996 |
| KR | 20000017695 | 10/2000 |
| KR | 20110067753 | 6/2011 |

OTHER PUBLICATIONS

International Search Report and Written Opinion for International Application No. PCT/US2025/032303, dated Oct. 10, 2025, 12 pages.

* cited by examiner 42
10
18
12
34
67
23
25
54
BX
BX
11
11

BALL VALVE WITH IMPROVED ASSEMBLY CONFIGURATION

BACKGROUND OF THE INVENTION

The present invention relates generally to the field of valves. The present invention relates specifically to a ball valve assembly having a valve body and a ball assembly. The ball assembly is configured to be positioned within the valve body and rotated with respect to the ball assembly to control the flow of fluid through the ball valve assembly.

SUMMARY OF THE INVENTION

One embodiment of the invention relates to a ball valve assembly including a one-piece, integrally-molded, plastic ball assembly and a one-piece, integrally-molded, valve body. The ball assembly is configured to be positioned within the valve body. The ball assembly includes a partial sphere defining a first flow passage substantially parallel to a first central axis. The ball assembly further includes a first cylindrical shaft centered on and extending from the partial sphere to a first distal end along a rotational axis that is perpendicular to the first central axis, and a second cylindrical shaft extending from the partial sphere to a second distal end along the rotational axis. The first cylindrical shaft extends away from a first side of the partial sphere in a first direction along the rotational axis. The second cylindrical shaft extends from the partial sphere in a second direction opposite the first direction with respect to the first central axis. A handle is formed at the first distal end of the first cylindrical shaft. The handle and the first cylindrical shaft define a pin hole that is oriented perpendicular to the rotational axis. The pin hole is positioned between the handle and the partial sphere. The valve body defines a second flow passage that is substantially parallel to a second central axis. The valve body includes a first end, a second end opposite the first end along the second central axis, a cylindrical wall, and a shaft enclosure wall. The cylindrical wall extends away from the second flow passage in the first direction along a bearing axis. The shaft enclosure wall extends away from the second flow passage in the second direction opposite the first direction along the bearing axis with respect to the second central axis. The shaft enclosure wall has a wall end closure which seals an end of the shaft enclosure wall that is displaced from the second flow passage in the second direction. A slot extends through an outer surface of the cylindrical wall and is located within a plane perpendicular to bearing axis. The slot extends radially around a portion of the cylindrical wall. When the ball assembly is positioned within the valve body, the rotational axis and the bearing axis are coincident, the first cylindrical shaft is positioned within the cylindrical wall, the second distal end of the second cylindrical shaft is enclosed within the shaft enclosure wall, and the pin hole is aligned with at least a portion of the slot. The ball valve assembly includes a pin configured to extend through and simultaneously engage the pin hole and the slot to retain the ball assembly within the valve body.

Another embodiment of the invention relates to a valve assembly including a one-piece, integrally-formed valve body and a one-piece, integrally-formed flow-control assembly. The valve body includes a first central axis, a first end, and a second end opposite the first end along the first central axis. A first cylindrical flow passage is substantially parallel to the first central axis and extends between the first end and the second end. The valve body further includes a cylindrical wall and a shaft enclosure wall. The cylindrical wall extends away from the first cylindrical flow passage in a first direction along a bearing axis. The bearing axis is perpendicular to the first central axis. The shaft enclosure wall extends away from the first cylindrical flow passage in a second direction opposite the direction with respect to the first central axis. A slot extends through an outer surface of the cylindrical wall. The slot is located on a plane perpendicular to the bearing axis. The slot extends radially around a portion of the cylindrical wall. The flow-control assembly is configured to be positioned within the valve body. The flow-control assembly includes a rotational axis, a partial sphere, a first cylindrical shaft, a second cylindrical shaft, and a handle. The partial sphere defines a second cylindrical flow passage substantially parallel to a second central axis. The second central axis is perpendicular to the rotational axis. The first cylindrical shaft extends along the rotational axis away from a first side of the partial sphere to a first distal end, and the second cylindrical shaft extends along the rotational axis away from a second side of the partial sphere opposite the first side to a second distal end. The handle is formed at the first distal end of the first cylindrical shaft. The handle and the first cylindrical shaft define a pin hole perpendicular to the rotational axis between the handle and the partial sphere. When the ball assembly is positioned within the valve body, the rotational axis and the bearing axis are coincident, the first cylindrical shaft is positioned within the cylindrical wall, the second cylindrical shaft is positioned within the shaft enclosure wall, and the pin hole is aligned with at least a portion of the slot. The ball valve assembly includes a pin extending along a pin axis. The pin is configured to extend through and simultaneously engage the pin hole and the slot to retain the ball assembly within the valve body.

Another embodiment of the invention relates to a method for assembling a ball valve and seal assembly. The method includes providing a one-piece, integrally-molded ball assembly. The ball assembly has a partial sphere defining a first flow passage substantially parallel to a first central axis. A first cylindrical shaft centered on and extends along a rotational axis that is perpendicular to the first central axis. The first cylindrical shaft extends away from a first side of the partial sphere in a first direction along the rotational axis. A second cylindrical shaft extends from a second side of the partial sphere in a second direction opposite to the first direction with respect to the first central axis. A handle is coupled to the first cylindrical shaft, and a pin hole extends perpendicular to the rotational axis. The pin hole is defined by the handle and the first cylindrical shaft and is positioned between the handle and the partial sphere. The method includes positioning a first seal on the first cylindrical shaft and positioning a second seal on the second cylindrical shaft. The method further includes providing a one-piece, integrally-molded valve body defining a second flow passage substantially parallel to a second central axis. The valve body includes a first end and a second end opposite the first end along the second central axis. A cylindrical wall extends away from the second flow passage in the first direction along a bearing axis. The cylindrical wall defines a first bearing surface disposed about the bearing axis. An enclosure wall extends away from the second flow passage in the second direction opposite the first direction with respect to the second central axis. The enclosure wall has a second bearing surface disposed about the bearing axis. A slot extends through an outer surface of the cylindrical wall. The slot is located within a plane perpendicular to the bearing axis. The slot extends radially around a portion of the cylindrical wall. The valve body further includes a valve seat groove defined in the valve body adjacent to the second flow passage. The method includes positioning a ball seal within the valve seat groove. The method also includes inserting the ball assembly into the valve body such that the partial sphere is in engagement with the ball seal, the first bearing surface is adjacent to the first seal, the second bearing surface is adjacent to the second seal, and at least a portion of the slot is aligned with the pin hole. The method further includes inserting a pin through the slot of the valve body and into the pin hole such that the pin simultaneously engages the pin hole and the slot to retain the ball assembly within the valve body.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, a valve assembly, such as ball valve assembly 10 is shown according to an exemplary embodiment. Ball valve assembly 10 is configured to use with hoses and other fluid communication devices for water, such as watering devices connected to city water supplies. Applicant believes that valve assemblies discussed herein reduces assembly time and labor by providing a one-piece flow-control assembly, which can be inserted and supported by a one-piece valve body. A pin is provided to extend through and simultaneously engage the flow control assembly and the valve body in order to securely retain the flow-control assembly within the valve body.

Figure 1:
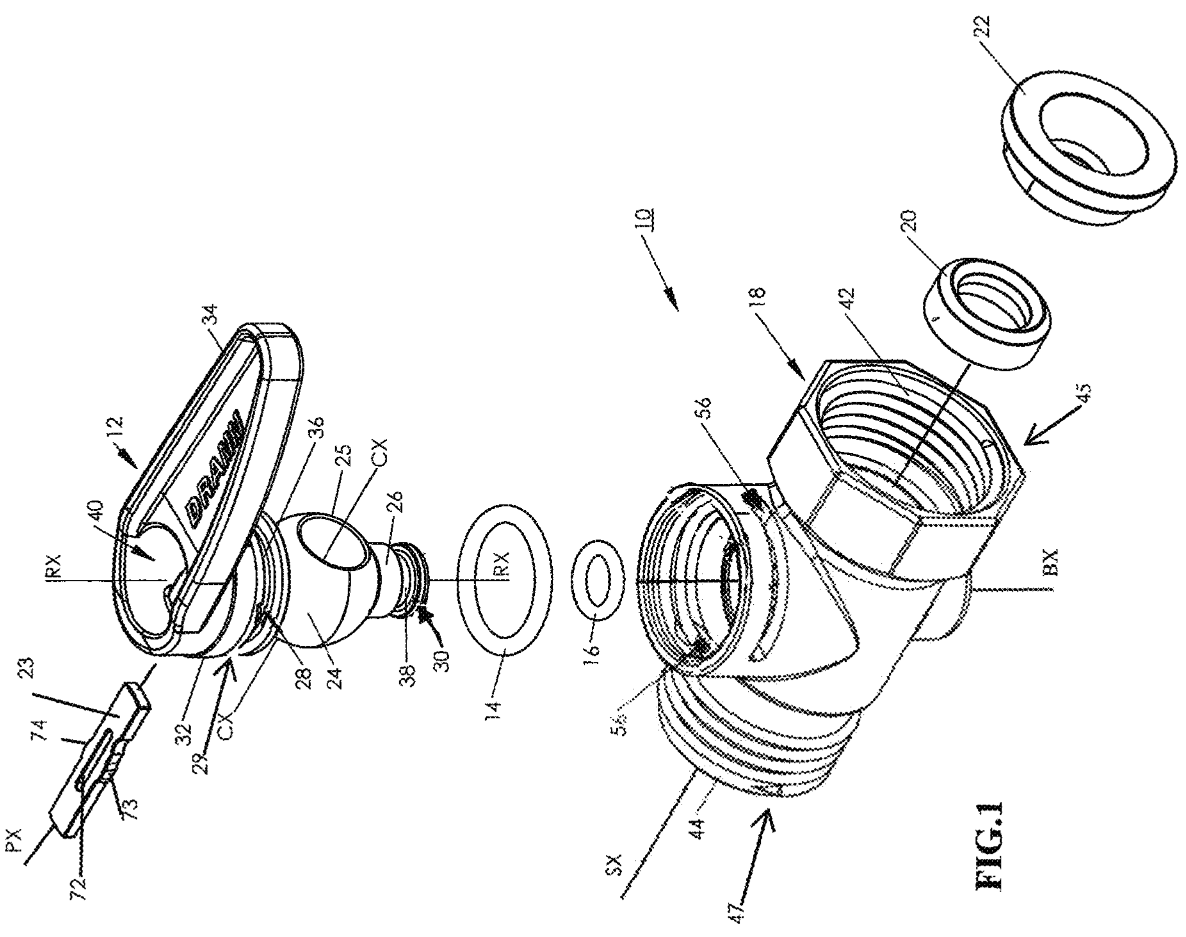
FIG. 1 is an exploded perspective view of a ball valve assembly, according to an exemplary embodiment.
Figure 2:
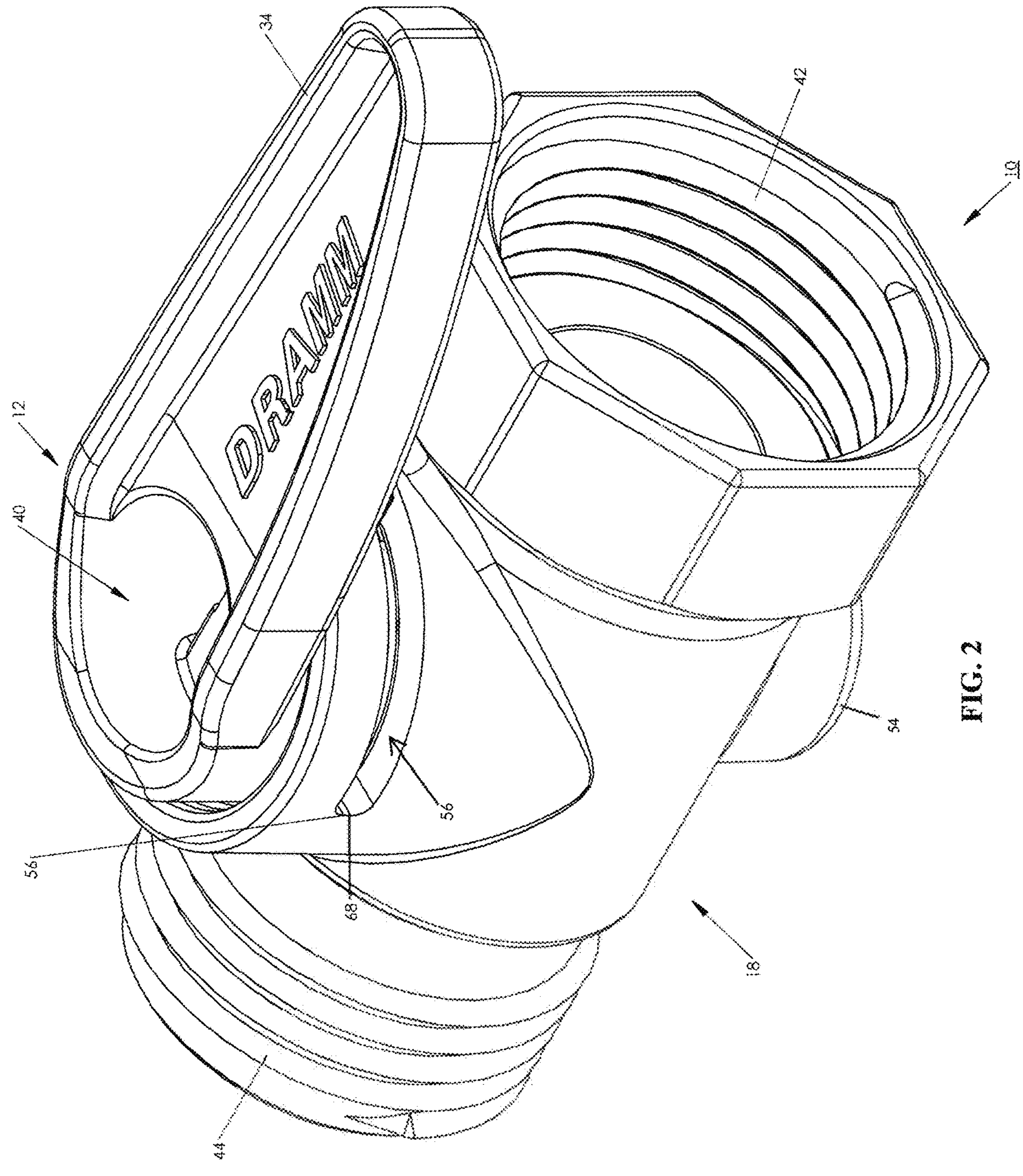
FIG. 2 is a perspective view of the ball valve assembly of FIG. 1, according to an exemplary embodiment.
Figure 3:
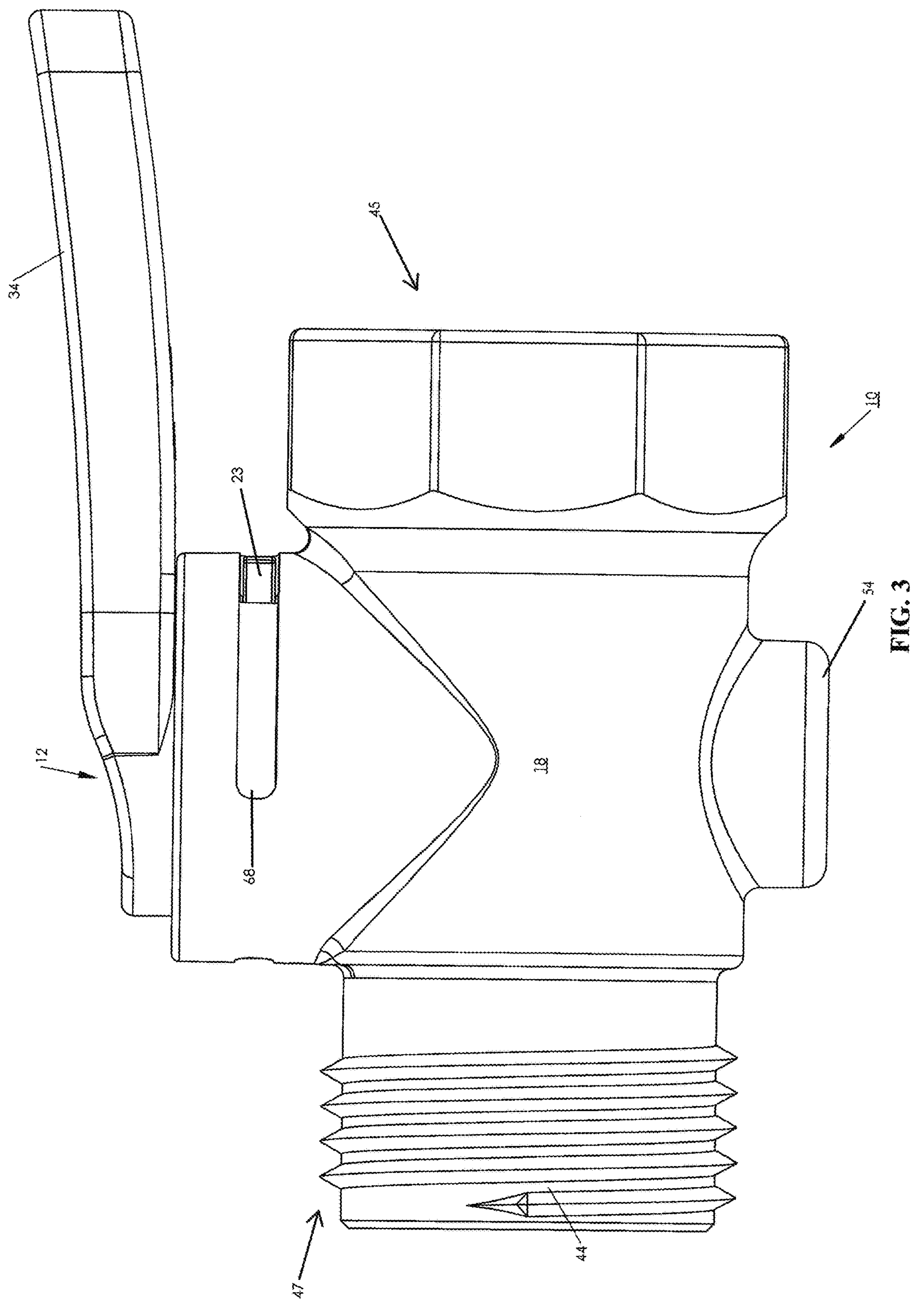
FIG. 3 is a side view of the ball valve assembly of FIG. 1, according to an exemplary embodiment.
Figure 4:
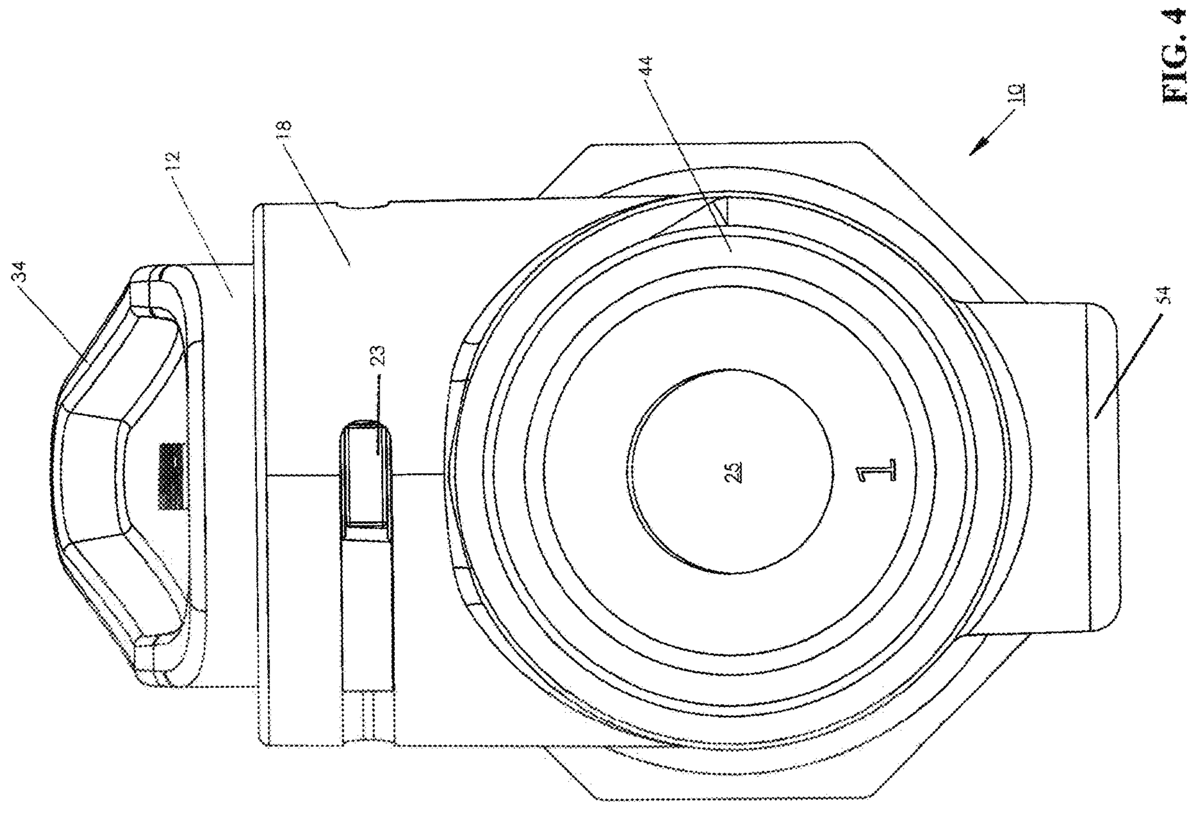
FIG. 4 is an end view of the ball valve assembly of FIG. 1, according to an exemplary embodiment.
Figure 5:
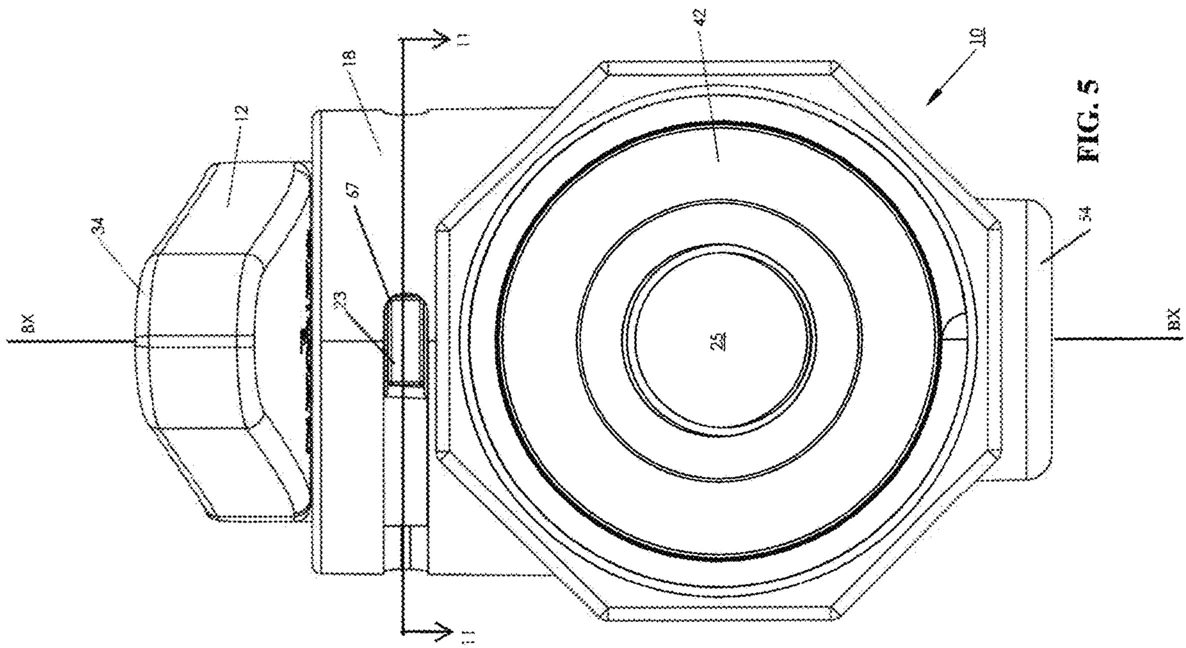
FIG. 5 is another end view of the ball valve assembly of FIG. 1, according to an exemplary embodiment.
Figure 6:
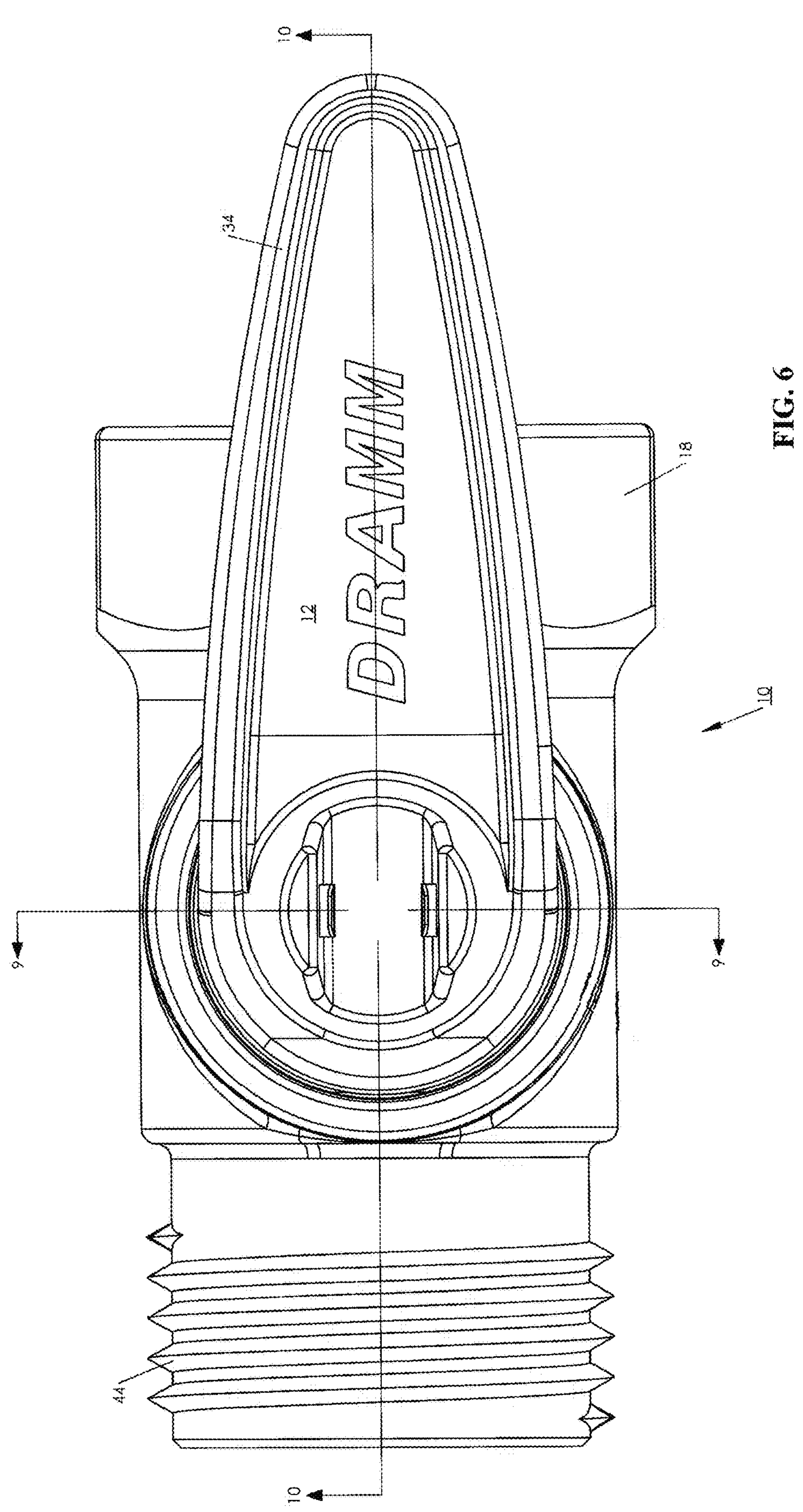
FIG. 6 is a top view of the ball valve assembly of FIG. 1, according to an exemplary embodiment.
Figure 7:
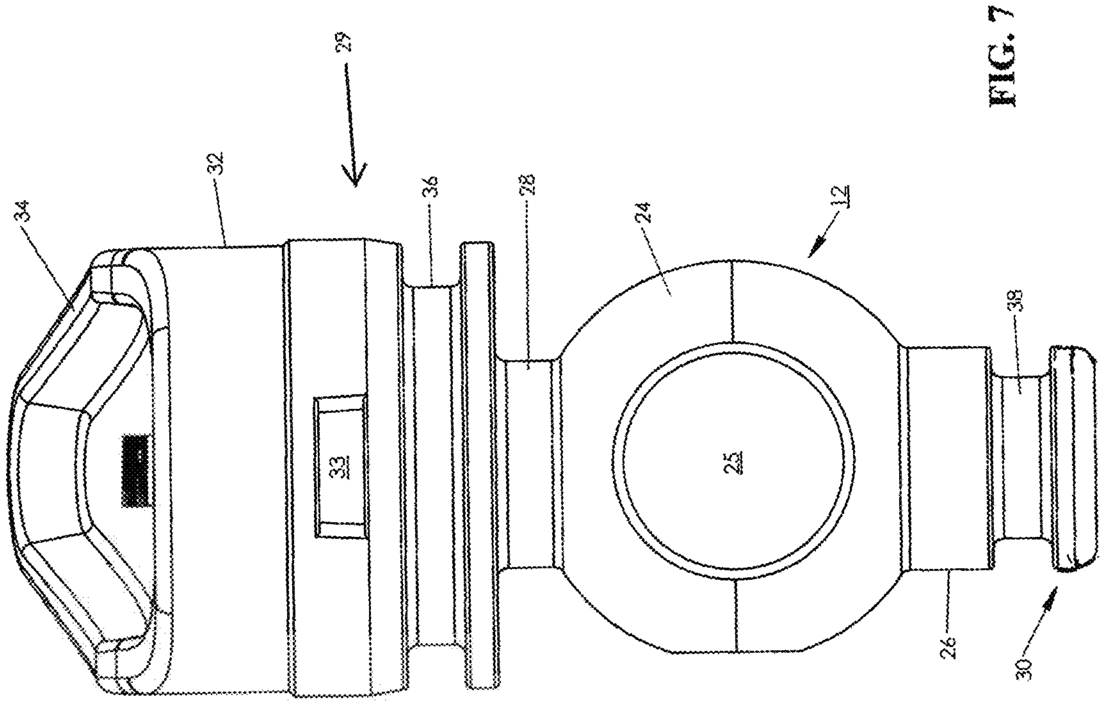
FIG. 7 is an end view of the ball assembly of the ball valve assembly of FIG. 1, according to an exemplary embodiment.
Figure 8:
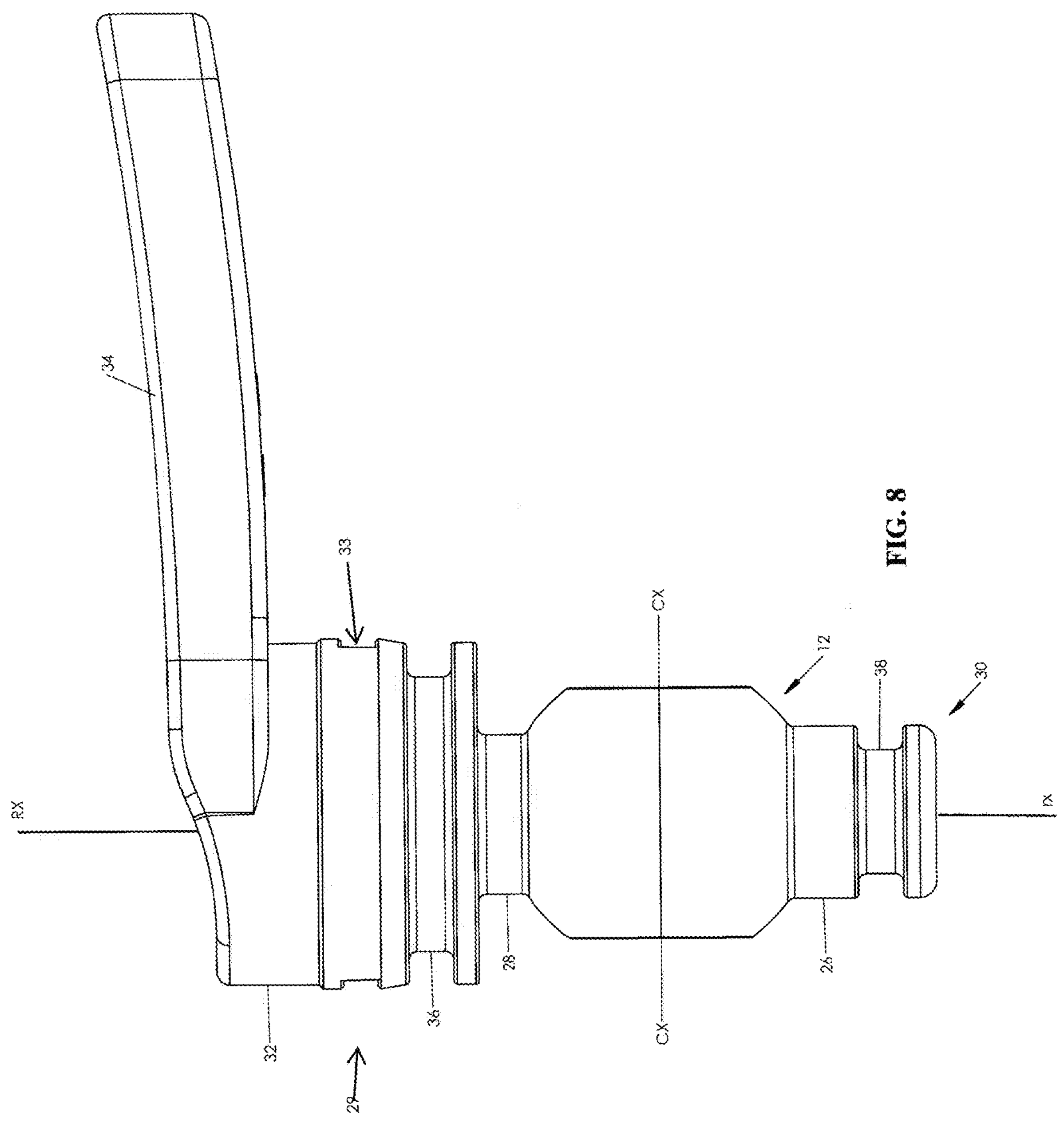
FIG. 8 is a side view of the ball assembly of FIG. 7, according to an exemplary embodiment.
Figure 9:
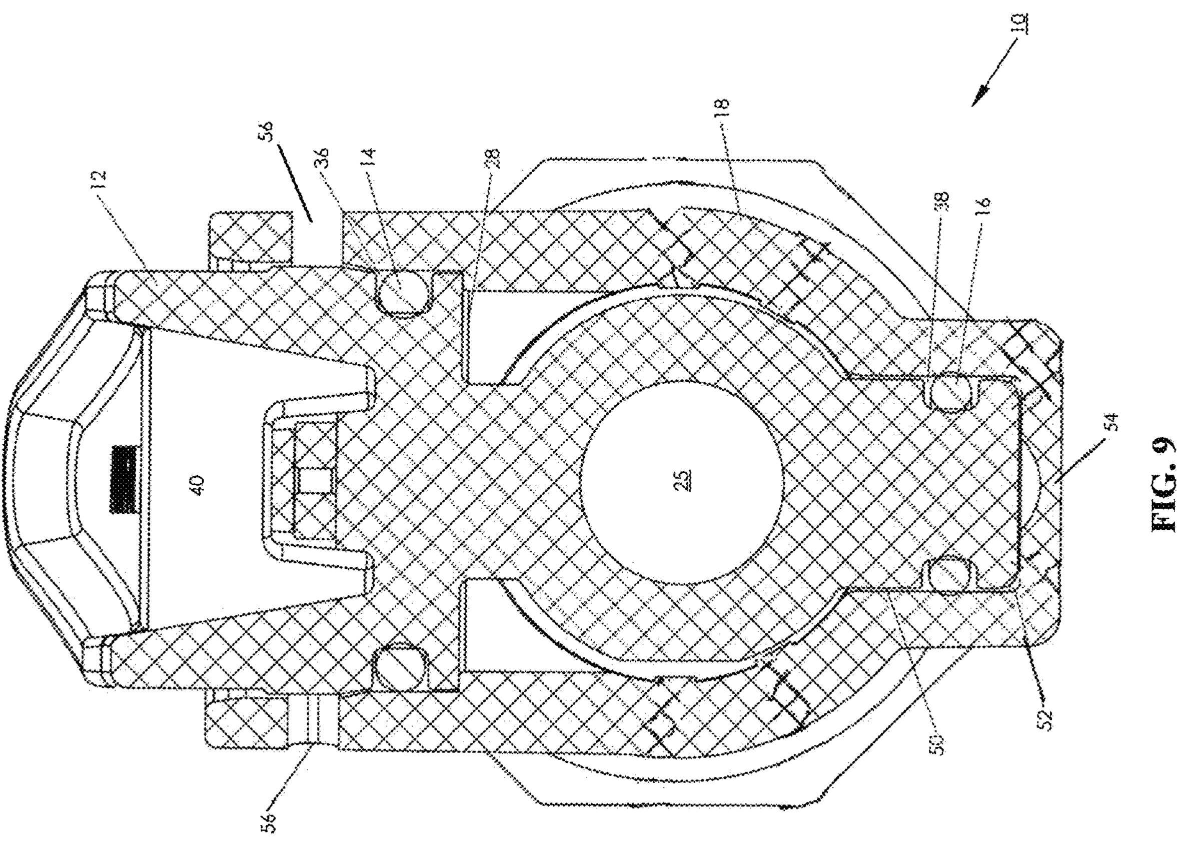
FIG. 9 is a cross-sectional view of the ball valve assembly taken along line 9-9 in FIG. 6, according to an exemplary embodiment.
Figure 10:
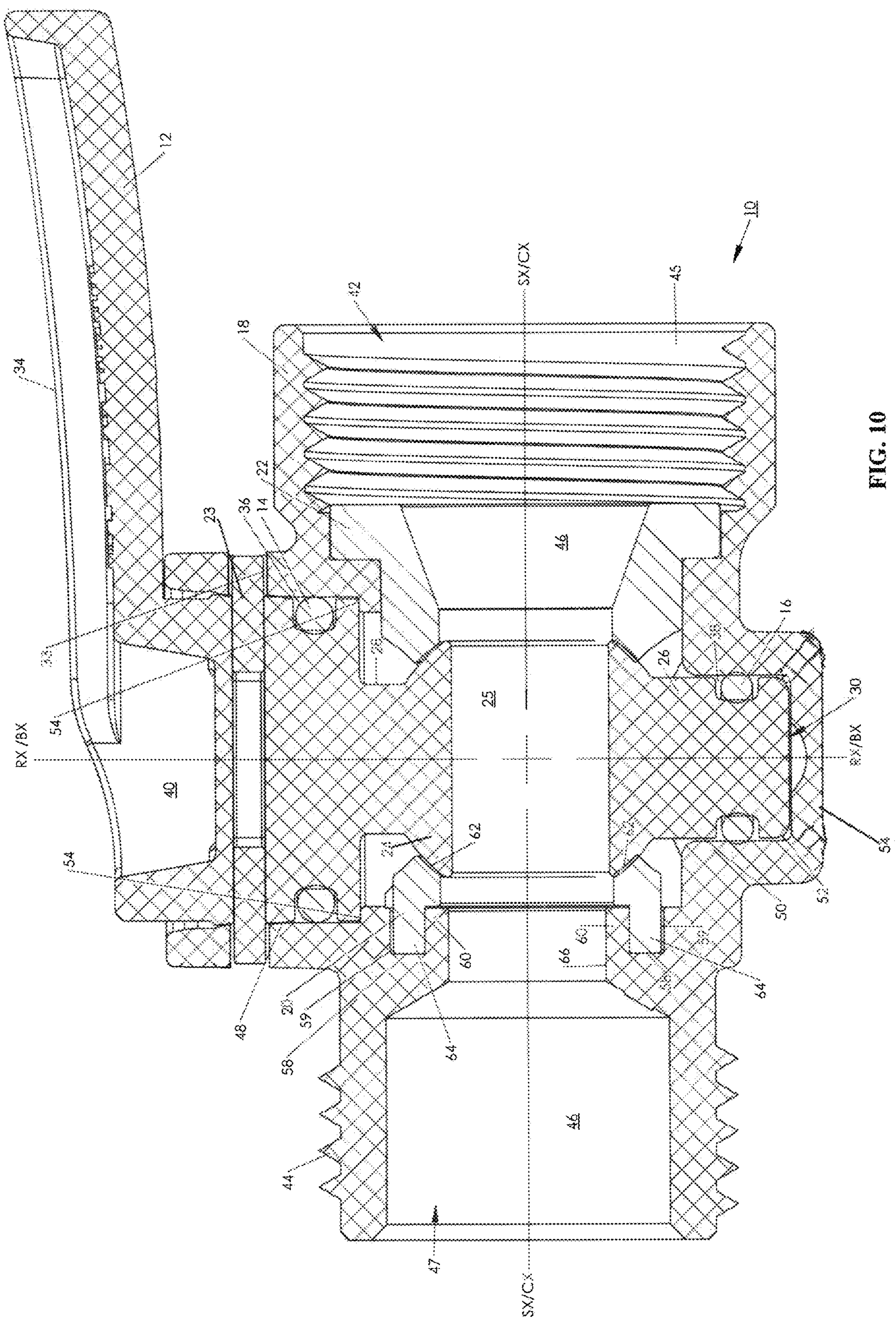
FIG. 10 is a cross-sectional view of the ball valve assembly taken along line 10-10 in FIG. 6, according to an exemplary embodiment.
Figure 11:
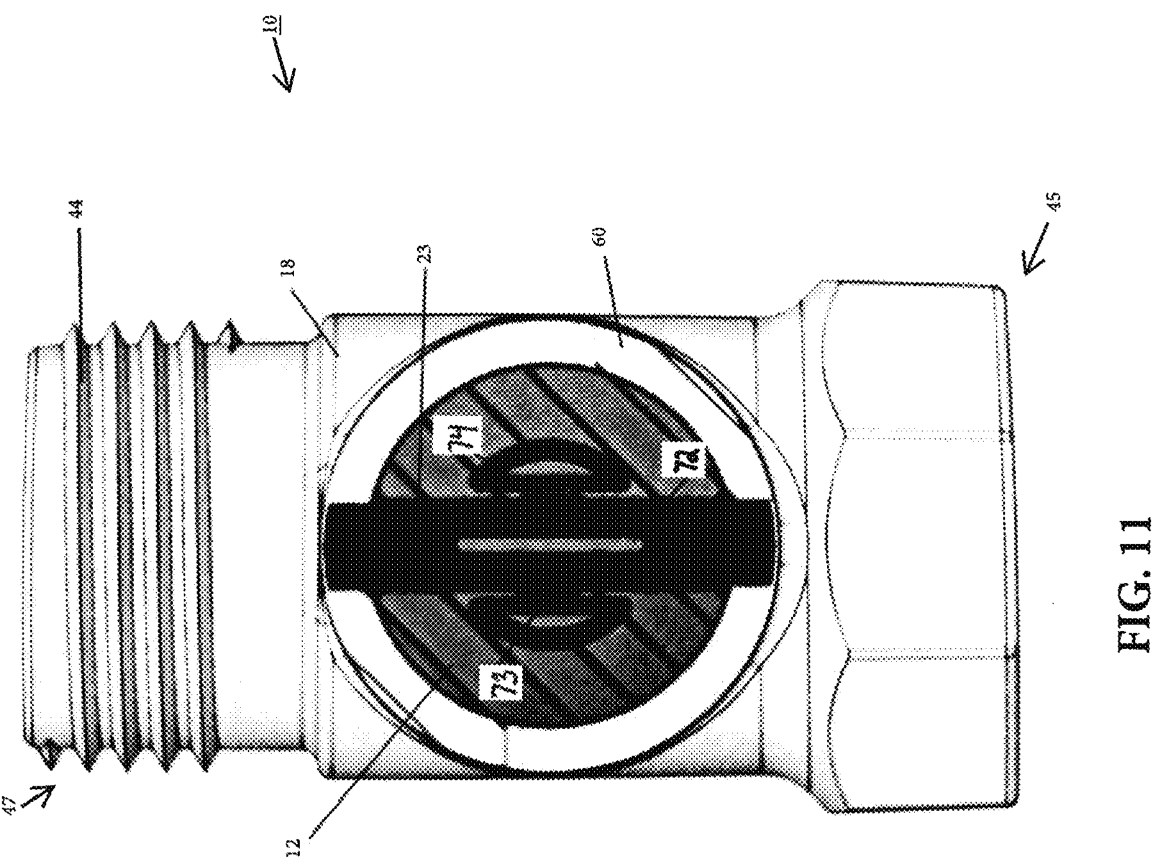
FIG. 11 is a cross-sectional view of the ball valve assembly taken along line 11-11 in FIG. 5, according to an exemplary embodiment.
Figure 12:
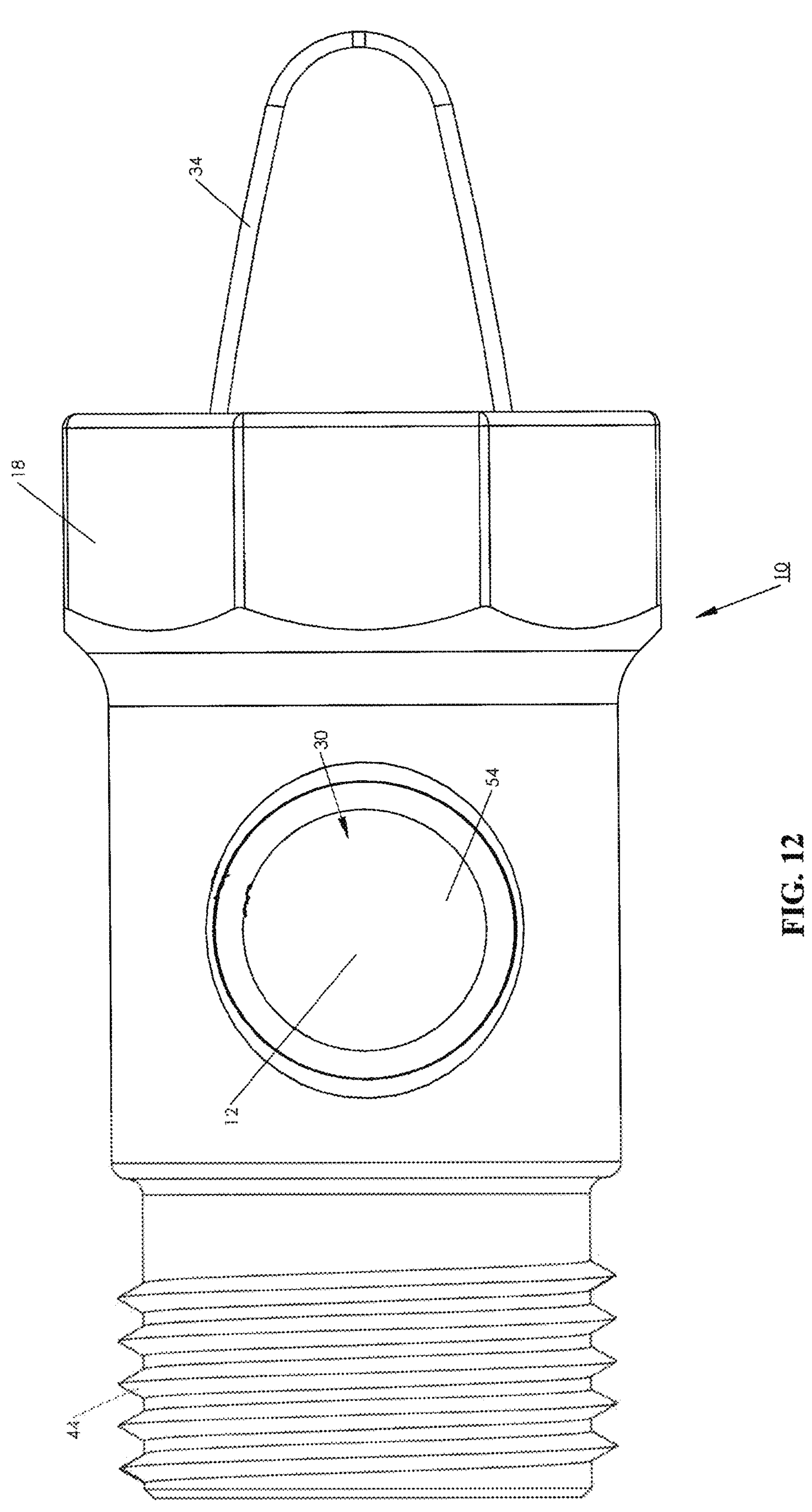
FIG. 12 is a bottom view of the ball valve assembly of FIG. 1, according to an exemplary embodiment.

Referring to FIG. 1, ball valve assembly 10 includes:

A flow-control assembly, such as ball assembly 12;
A first seal 14 (e.g., an O-ring);
A second seal 16 (e.g., an O-ring);
A valve body 18;
A ball valve seal 20;
A hose seal 22; and
A pin 23.

FIGS. 2-6 and 9-12 illustrate ball valve 10 with all of the components assembled such that ball assembly 12 is positioned within valve body 18, and pin 23 extends through and simultaneously engages ball assembly 12 and valve body 18 to retain ball assembly 12 within valve body 18.

The description of ball assembly 12 is now made in reference to FIGS. 1 and 7-11. As shown, ball assembly 12 is a one-piece injection molded plastic structure. In a certain embodiment, the plastic used for ball assembly 12 is Polyoxymethylene (POM), also known as acetal, polyacetal and polyformaldehyde, which provides high stiffness, low friction, and an appropriate dimensional stability. In other embodiments, ball assembly 12 may be formed from a metal, such as brass or stainless steel. Ball assembly 12 includes:

a partial sphere 24;
a cylindrical flow passage 25;
a cylindrical shaft 26;
a cylindrical shaft 28;
a distal end 29 of cylindrical shaft 28;
a distal end 30 of cylindrical haft 26;
a bearing journal 32;
a pin hole 33;
a handle 34;
a cylindrical groove 36; and
a cylindrical groove 38.

Partial sphere 24 defines cylindrical flow passage 25. Cylindrical flow passage 25 is substantially parallel to a central axis CX. Cylindrical shaft 26 and cylindrical shaft 28 extend along a rotational axis RX. Rotational axis RX is perpendicular to central axis CX. first cylindrical shaft 28 extends away from a first side (e.g., top side) of partial sphere 24 in a first direction (e.g., an upwards direction). First cylindrical shaft 28 is centered on and extends along rotational axis RX away from partial sphere 24 to distal end 29. First cylindrical shaft 28 has a first radius. Bearing journal 32 extends from distal end 29 along rotational axis RX in the first direction. Bearing journal 32 has a second radius greater than the radius of First cylindrical shaft 28. Cylindrical groove 36 is located between located between bearing journal 32 and partial sphere 24. More specifically, cylindrical groove 26 is located between distal end 29 and partial sphere 24. Cylindrical groove 26 is configured to receive and retain first seal 14.

Handle 34 is coupled to distal end 29 of first cylindrical shaft 28. More specifically handle 34 is formed with journal bearing 32. A depression 40 may be formed at the interface between journal bearing 32 and handle 34 to conserve the material from which ball assembly 12 is fabricated. Depression 40 may also serve as a tooling interface which inserts assembly 12 into valve body 18. Handle 34 and distal end 29 define pin hole 33. More specifically, bearing journal 32, handle 34, and distal end 29 define pin hole 33. As shown, pin hole 33 extends along the width of bearing journal 32. Pin hole 33 is positioned between handle 34 and partial sphere 24 and is oriented perpendicular to rotational axis RX.

Second cylindrical shaft 26 extends from partial sphere 24 to distal end 30 along rotational axis RX. Second cylindrical shaft 26 extends from a second side (e.g., bottom side) of partial sphere 24 in a second direction (e.g., a downwards direction) opposite the first direction with respect to central axis CX. Second cylindrical shaft 26 includes cylindrical grove 38 configured to receive and retain second seal 16. Cylindrical groove 38 is defined along second cylindrical shaft 26 between partial sphere 24 and distal end 30. When ball valve assembly 10 is assembled, first seal 14 is located in cylindrical groove 36, and second seal 16 is located in cylindrical groove 38.

The description of valve body 18 is now made in reference to FIGS. 1-6, and 9-12. As shown, valve body 18 is a one-piece injection molded plastic structure. In a certain embodiment, the plastic used for valve body 18 is acrylonitrile butadiene styrene (ABS). In other embodiments, ball assembly 12 may be formed from a metal, such as brass or stainless steel. Valve body 18 includes:

- internal threads 42;
- external threads 44;
- First end 45;
- Cylindrical flow passage 46;
- Second end 47;
- Bearing surface 48;
- Bearing surface 50;
- Shaft enclosure wall 52;
- Wall end closure 54;
- Slots 56;
- valve seat groove 58;
- Cylindrical seat surface 59;
- Cylindrical wall 60;
- Seal surface 62;
- Cylindrical extension 64; and
- Flow surface 66.

Valve body 18 has a first end 45 and a second end 47. Second end 47 is opposite first end 45 along a second central axis SX. Valve body 18 defines cylindrical flow passage 46. Cylindrical flow passage 46 is substantially parallel central axis SX and extends between first end 45 and second end 47. First end 45 includes internal threads 42 and second end includes external threads 44. Threads 42, 44 are configured to engage with a variety of watering devices, such as a standard garden hose. In certain embodiments, threads 42, 44 are configured to engage with treads or are replaced with a smooth surface to provide a soldered plumbing joint (e.g., sweat joint).

Cylindrical wall 60 extends away from cylindrical flow passage 46 in a first direction (e.g., an upwards direction) along a bearing axis BX. Bearing axis BX is perpendicular to central axis SX. At least one slot 56 extends through an outer surface of cylindrical wall 60. As shown, two slots 56 extends through the outer surface of cylindrical wall 60. Slots 56 are located within a plane perpendicular to bearing axis BX. Slots 56 extend radially around cylindrical wall 60 with respect to bearing axis BX. Slots 56 are spaced from each other such that there is a solid, uninterrupted portion of the outer surface positioned between each slot 56.

Shaft enclosure wall 52 extends away from cylindrical flow passage 46 in the second direction (e.g., a downwards direction) opposite the first direction along bearing axis BX with respect to central axis SX. Shaft enclosure wall 52 includes wall end closure 54. Wall end closure 54 seals an end of shaft enclosure wall 52 that is displaced from cylindrical flow passage 46 in the second direction. Wall end closure 54 is spaced a distance from cylindrical flow passage 46 and is configured such that no openings are formed along an outer surface of wall end closure 54.

Valve body 18 includes bearing surfaces 48, 50 and valve seat groove 58. Cylindrical wall 60 defines bearing surface 48. Bearing surface 48 is disposed about bearing axis BX. When ball valve assembly 10 is assembled, first seal 14 is positioned between first cylindrical shaft 28 and bearing surface 48. Shaft enclosure wall 52 defines bearing surface 50. Bearing surface 50 is disposed about bearing axis BX. When ball valve assembly 10 is assembled, second seal 16 is positioned between bearing surface 50 and second cylindrical shaft 26. Valve seat groove 58 is defined along a portion of cylindrical wall adjacent to cylindrical flow passage 46. Valve seat groove 58 is further defined by a cylindrical seat surface 59. When ball valve assembly 10 is assembled, ball seal 20 is located in valve seat groove 58.

Ball valve assembly 10 further includes pin 23. Pin 23 is configured to extend through and simultaneously engage pin hole 33 and slots 56 to retained ball assembly 12 within valve body 18. Pin 23 extends along a pin axis PX. Slots 56 each include a first end 67 and a second end 68. Pin 23 is configured to travel along slots 56 between first end 67 and second end 68. Pin 23 includes structure configured to engage and retain pin 23 within pin hole 33. As shown, pin 23 includes a central slot 72 and side edges 73, 74, which are used to engage an inside surface of ball assembly 12 to retain pin 23 in pin hole 33.

When ball assembly 12 is positioned within valve body 18, rotational axis RX and bearing axis BX are coincident. First cylindrical shaft 28 is positioned within cylindrical wall 60 and second cylindrical shaft 26 is positioned within shaft enclosure wall 52. More specifically, second distal end 30 of second cylindrical shaft 26 is enclosed within shaft enclosure wall 52. Further, pin hole 33 is aligned with at least a portion of slot 56. Pin 23 may be inserted into slot 56 and through pin hole 33 to retain ball assembly 12 in valve body 18. In particular, pin 23 restricts movement of ball assembly 12 in the first and second directions along rotational axis, while permitting allowing rotational movement of ball assembly 12 around rotational axis RX.

When ball assembly 12 is positioned within valve body 18, valve seat groove 58 is located adjacent to the partial sphere 24 such that ball seal 20 is positioned between partial sphere 24 and second end of valve body 18. Ball seal 20 includes a sealing surface 62 configured to conform to the surface of partial sphere 24. Ball seal 20 includes a first cylindrical extension 64 which is located within the valve seat groove 58. Hose seal 22 is positioned between first end 45 of valve body 18 and partial sphere 24.

Ball assembly 12, first seal 14, second seal 16, ball seal 20, hose seal 22, and valve body 18 cooperate to permit rotation of the ball valve assembly 10 between an opened position and a closed position. When in the closed position, the partial sphere 24 and ball seal 20 cooperate to prevent fluid communication through first cylindrical flow passage 25 and second cylindrical flow passage 46 such that fluid pressure forces partial sphere 24 against ball seal 20. As shown, ball valve assembly 10 is in the closed position, when ball assembly 12 is rotated within valve body 18 such that central axis CX and central axis SX are generally perpendicular.

When in the opened position, ball assembly 12 is rotated around rotational axis RX such that fluid can flow through first cylindrical flow passage 25 and second cylindrical flow passage 46 from first end 45 of valve body 18 to second end 47 of valve body 18. As shown, ball valve assembly 10 is in the opened position, when ball assembly 12 is rotated within valve body 18 such that central axis CX and central axis SX are generally parallel. In a certain embodiment, when in the opened position, pin axis PX is parallel to central axis CX.

To limit rotation of valve body 18, Pin 23 is retained between first ends 67 of slots 56 and second ends 68 of slots

56. When pin 23 interfaces with first end 67 or second end 68 of a slot 56, rotation of ball assembly 12 around rotational axis RX is stopped. As shown, when in the opened position, pin 23 is located at first end 67 of slot 56, and when in the closed position, pin 23 is located at second end 68 of slot 56.

In certain embodiments, seals 14, 16 and 20 may be fabricated from a synthetic rubber, such as EPDM 70 durometer rubber (ethylene propylene rubber). In other certain embodiments, lubricant, such as a silicone spray, may be applied to ball valve assembly 10 to facilitate manual opening and closing of ball valve assembly 10.

In another embodiment, a method for assembling the ball valve assemblies described above is provided. The method includes providing ball assembly 12, valve body 18, first seal 14, second seal 16, and ball seal 20. First seal 14 is positioned on first cylindrical shaft 28, and second seal is positioned on the second cylindrical shaft 26. Ball seal 20 is positioned within valve seat groove 58 of valve body 18. Ball assembly 12 is positioned within valve body 18 such that partial sphere 24 is in engagement with ball seal 20. In this way, first bearing surface 48 is adjacent to first seal 14, and second bearing surface 50 is adjacent to second seal 16. At least a portion of slot 56 is aligned with pin hole 33. Pin 23 is inserted through slot 56 of valve body 18 and through pin hole 33 such that pin 23 simultaneously engages pin hole 33 and slot 56 to retain ball assembly 12 within valve body 18. The method may further include injection molding ball assembly 12 from plastic, and injection molding valve body 18 from plastic. The method may also include applying a lubricant to ball seal 20.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A method for assembling a ball valve and seal assembly comprising the steps of:

providing a one-piece, integrally-molded ball assembly, the ball assembly comprising a partial sphere defining a first flow passage substantially parallel to a first central axis, a first cylindrical shaft centered on and extending along a rotational axis that is perpendicular to the first central axis, the first cylindrical shaft extending away from a first side of the partial sphere in a first direction along the rotational axis, a second cylindrical shaft extending from a second side of the partial sphere in a second direction opposite to the first direction with respect to the first central axis, a handle coupled to the first cylindrical shaft, and a pin hole extending perpendicular to the rotational axis, the pin hole defined by the handle and the first cylindrical shaft and positioned between the handle and the partial sphere;

positioning a first seal on the first cylindrical shaft;

positioning a second seal on the second cylindrical shaft;

providing a one-piece, integrally-molded valve body defining a second flow passage substantially parallel to a second central axis, the valve body comprising a first end, a second end opposite the first end with along the second central axis, a cylindrical wall extending away from the second flow passage in the first direction along a bearing axis, the cylindrical wall defining a first bearing surface disposed about the bearing axis, an enclosure wall extending away from the second flow passage in the second direction opposite the first direction with respect to the second central axis, the enclosure wall having a second bearing surface disposed about the bearing axis, a first slot extending through an outer surface of the cylindrical wall, the first slot located within a plane perpendicular to the bearing axis, the first slot extending radially around a portion of the cylindrical wall, a second slot extending through the outer surface of the cylindrical wall and extending radially the outer surface opposite the first slot, and a valve seat groove defined in the valve body adjacent to the second flow passage;

positioning a ball seal within the valve seat groove;

inserting the ball assembly into the valve body such that the partial sphere is in engagement with the ball seal, the first bearing surface is adjacent to the first seal, the second bearing surface is adjacent to the second seal, and at least a portion of the first slot is aligned with the pin hole; and inserting a pin through the first slot of the valve body and into the pin hole and through the second slot such that the pin simultaneously engages the pin hole, the first slot, and the second slot to retain the ball assembly within the valve body.

2. The method of claim 1, further comprising the step of injection molding the ball assembly from plastic, and further comprising the step of injection molding the valve body from plastic.

3. The method of claim 1, further comprising the step of applying a lubricant to the ball seal.

4. A ball valve assembly, comprising:

a one-piece, integrally-molded, plastic ball assembly configured to be positioned within a valve body, the ball assembly comprising:

a partial sphere defining a first flow passage substantially parallel to a first central axis;

a first cylindrical shaft centered on and extending from the partial sphere to a first distal end along a rotational axis that is perpendicular to the first central axis, the first cylindrical shaft extending away from a first side of the partial sphere in a first direction along the rotational axis;

a second cylindrical shaft extending from the partial sphere to a second distal end along the rotational axis, the second cylindrical shaft extending away from a second side of the partial sphere in a second direction opposite to the first direction with respect to the first central axis; and a handle formed at the first distal end of the first cylindrical shaft, the handle and the first cylindrical shaft defining a pin hole perpendicular to the rotational axis, the pin hole positioned between the handle and the partial sphere;

a one-piece, integrally-molded, valve body defining a second flow passage that is substantially parallel to a second central axis, the valve body comprising:

a first end;

a second end opposite the first end along the second central axis;

a cylindrical wall extending away from the second flow passage in the first direction along a bearing axis;

a shaft enclosure wall extending away from the second flow passage in the second direction opposite to the first direction along the bearing axis with respect to the second central axis, the shaft enclosure wall including a wall end closure which seals an end of the shaft enclosure wall displaced from the second flow passage in the second direction;

a first slot extending through an outer surface of the cylindrical wall, the first slot located within a plane perpendicular to the bearing axis, the first slot extending radially around a portion of the cylindrical wall; and a second slot extending through the outer surface of the cylindrical wall and extending radially around the rotational axis along the outer surface opposite the first slot;

wherein when the ball assembly is positioned within the valve body, the rotational axis and the bearing axis are coincident, the first cylindrical shaft is positioned within the cylindrical wall, the second distal end of the second cylindrical shaft is enclosed within the shaft enclosure wall, and the pin hole is aligned with at least a portion of the first slot; and a pin configured to extend through and simultaneously engage the pin hole, the first slot, and the second slot to retain the ball assembly within the valve body when the ball assembly is positioned within the valve body.

5. The ball valve assembly of claim 4, wherein the cylindrical wall defines a first bearing surface disposed about the bearing axis, and the ball valve assembly further comprises a first seal positioned between the first cylindrical shaft and the first bearing surface.

6. The ball valve assembly of claim 5, wherein the shaft enclosure wall defines a second bearing surface disposed about the bearing axis, and the ball valve assembly further comprises a second seal positioned between the second cylindrical shaft and the second bearing surface.

7. The ball valve assembly of claim 6, wherein the first cylindrical shaft comprises a first cylindrical groove located between the first distal end and the partial sphere, and the second cylindrical shaft comprises a second cylindrical groove located between the second distal end and the partial sphere, and wherein the first seal is located in the first cylindrical groove and the second seal located in the second cylindrical groove.

8. The ball valve assembly of claim 7, wherein the pin hole is positioned between the handle and the first cylindrical groove.

9. The ball valve assembly of claim 5, wherein the first seal and second seal are rubber O-rings.

10. The ball valve assembly of claim 5, wherein the valve body further comprises a valve seat groove defined along a portion of the cylindrical wall adjacent to second flow passage, wherein the ball valve assembly further comprises a ball seal positioned in the valve seat groove, the ball seal comprising a first surface configured to conform to an outer surface of the partial sphere and a first cylindrical extension which is located within the valve seat groove.

11. The ball valve assembly of claim 10, wherein the ball seal is fabricated from EPDM.

12. The ball valve assembly of claim 4, wherein the first end of the valve body comprises an internal thread, and wherein the second end of the valve body comprises an external thread.

13. A valve assembly comprising:

a one-piece, integrally-formed valve body, comprising:

a first central axis;

a first end;

a second end opposite the first end along the first central axis;

a first cylindrical flow passage substantially parallel to the first central axis and extending between the first end and the second end;

a cylindrical wall extending away from the first cylindrical flow passage in a first direction along a bearing axis perpendicular to the first central axis;

a shaft enclosure wall extending away from the first cylindrical flow passage in a second direction opposite the first direction with respect to the first central axis; and a first slot extending through an outer surface of the cylindrical wall, the first slot located within a plane perpendicular to the bearing axis, the first slot extending radially around a portion of the cylindrical wall; and a second slot extending through the outer surface of the cylindrical wall and extending radially around the rotational axis along the outer surface opposite the first slot;

a one-piece, integrally-formed flow-control assembly configured to be positioned within the valve body, the flow-control assembly comprising:

a rotational axis;

a partial sphere defining a second cylindrical flow passage substantially parallel to a second central axis, the second central axis perpendicular to the rotational axis;

a first cylindrical shaft extending along the rotational axis away from a first side of the partial sphere to a first distal end;

a second cylindrical shaft extending along the rotational axis away from a second side of the partial sphere opposite to the first side to a second distal end;

a handle formed at the first distal end of the first cylindrical shaft, the handle and the first cylindrical shaft defining a pin hole perpendicular to the rotational axis between the handle and the partial sphere;

wherein when the flow-control assembly is positioned within the valve body, the rotational axis and the bearing axis are coincident, the first cylindrical shaft is positioned within the cylindrical wall, the second cylindrical shaft is positioned within the shaft enclosure wall, and the pin hole is aligned with at least a portion of the first slot; and a pin extending along a pin axis, the pin configured to extend through and simultaneously engage the pin hole, the first slot, and the second slot to retain the flow-control assembly within the valve body, when the flow-control assembly is positioned within the valve body.

14. The valve assembly of claim 13, wherein the valve body further comprises a valve seat groove defined along a portion of the cylindrical wall adjacent to the first cylindrical flow passage, wherein the valve assembly further comprises a ball seal positioned in the valve seat groove, the ball seal comprising a first surface configured to conform to an outer surface of the partial sphere and a first cylindrical extension which is located within the valve seat groove, wherein when the flow-control assembly is positioned within the valve body, the ball seal is positioned between the second end of the valve body and the partial sphere.

15. The valve assembly of claim 14, wherein the flow-control assembly is configured to rotate around the rotational axis when positioned within the valve body between and an opened position and a closed positioned, wherein, when in the closed position, the partial sphere and ball seal prevent fluid communication through the first and second cylindrical flow passages such that fluid pressure within the flow-control assembly forces the partial sphere against the ball seal, and wherein and when in the opened position the flow-control assembly is rotated around the rotational axis within the valve body such that fluid can flow through the first and second cylindrical flow passages.

16. The valve assembly of claim 15, wherein when in the opened position, the pin axis is parallel to the first central axis.

17. The valve assembly of claim 15, wherein the first slot comprises a first end and a second end, wherein when in the opened position the pin is located at the first end of the first slot, and wherein when in the closed position the pin is located at the second end of the first slot.

18. The valve assembly of claim 14, further comprising a hose seal, wherein the hose seal is along a portion of the cylindrical wall adjacent to the first end of the valve body, wherein when the flow-control assembly is positioned within the valve body the hose seal is positioned between the first end of the valve body and the partial sphere.

19. The valve assembly of claim 13, wherein the shaft enclosure wall comprises a wall end closure which seals an end of the shaft enclosure wall displaced from the second cylindrical flow passage, and wherein the second distal end of the second cylindrical shaft is enclosed within the shaft enclosure wall when the flow-control assembly is positioned within the valve body.

* * * * *